United States Patent [19]

Tsuruoka

[11] 4,231,651
[45] Nov. 4, 1980

[54] CAMERA BODY

[75] Inventor: Tomio Tsuruoka, Tokyo, Japan

[73] Assignee: Nippon Kogaku K.K., Tokyo, Japan

[21] Appl. No.: 24,677

[22] Filed: Mar. 28, 1979

[30] Foreign Application Priority Data

Mar. 29, 1978 [JP]   Japan ................. 53-39310[U]

[51] Int. Cl.³ ............................................. G03B 17/02
[52] U.S. Cl. .................................................... 354/288
[58] Field of Search .............. 354/202, 203, 275, 288, 354/187, 212, 213; 16/128, 149, 168, 169, 152, DIG. 13

[56] References Cited

U.S. PATENT DOCUMENTS

| | | | |
|---|---|---|---|
| 2,208,797 | 7/1940 | Kende | 354/187 |
| 2,754,536 | 7/1956 | Troche et al. | 16/128 R |
| 3,066,588 | 12/1962 | Hell | 354/288 |
| 3,206,792 | 9/1965 | Beck | 16/128 R |
| 3,606,065 | 9/1971 | Carlson | 354/288 X |

FOREIGN PATENT DOCUMENTS 251405  1/1967  Austria ................. 354/212

*Primary Examiner*—Donald A. Griffin
*Attorney, Agent, or Firm*—Fitzpatrick, Cella, Harper & Scinto

[57] ABSTRACT

In a camera body, supporting members for rotatably supporting the end of the back lid are integrally formed with an upper cover and a lower cover on the opposed surfaces of the ends of the upper and lower covers secured to the upper portion and the lower portion, respectively, of a camera's interior body.

4 Claims, 2 Drawing Figures

CAMERA BODY

BACKGROUND OF THE INVENTION

1. Field of the Invention

This invention relates to improvements in a camera body having a pivotally mounted back lid.

2. Description of the Prior Art

A camera body is known in which a rotatable shaft provided on one side of a back lid is rotatably supported by bearing members which are mounted by means of screws or the like. However, this device comprises a number of parts including the bearing members mounted to the camera body and the screws for mounting the bearing members to the camera body and this has meant cumbersome and time-consuming procedures of manufacture which in turn has led to higher cost.

SUMMARY OF THE INVENTION

The present invention has for its object to provide a camera body having a pivotally mounted back lid which comprises a small number of parts and accordingly is simple in construction.

According to the construction of the present embodiment, supporting members for rotatably supporting the rotatable shaft at the end of the back lid are integrally formed with an upper cover and a lower cover on the opposed surfaces of the ends of the upper and lower covers secured to the upper portion and the lower portion, respectively, of a camera's interior body.

The invention will become more fully apparent from the following detailed description thereof taken in conjunction with the accompanying drawings.

DESCRIPTION OF THE PREFERRED EMBODIMENTS

Figure 1:
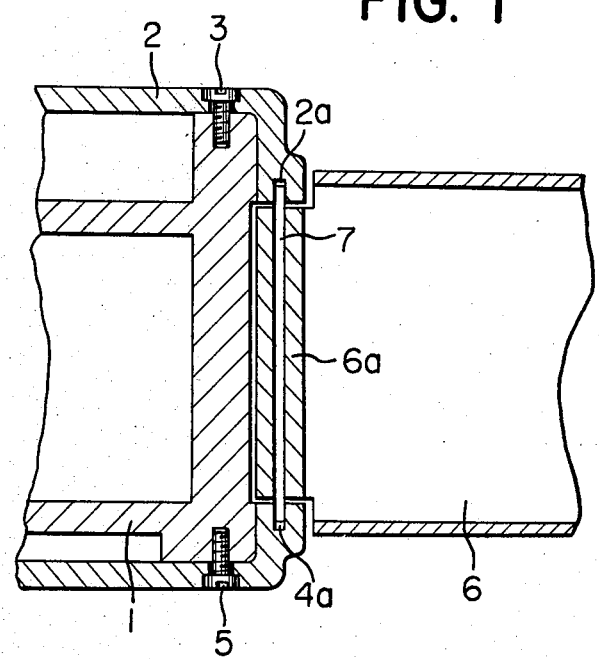
FIG. 1 is a cross-sectional view of an embodiment of the present invention.

Referring to FIG. 1, it is a cross-sectional view showing a first embodiment of the present invention. An upper cover 2 covering the upper portion of a camera's interior body 1 is secured to the camera's interior body 1 by means of a screw 3. A lower cover 4 covering the lower portion of the camera's interior body 1 is likewise secured to the camera's interior body 1 by means of a screw 5. A back lid 6 has a rotatable shaft 7 at one end 6a thereof. Formed on the opposed surfaces of the upper cover 2 and the lower cover 4 are bearing portions 2a and 4a which rotatably support the rotatable shaft 7. These bearing portions 2a and 4a are formed by partly depressing the opposed surfaces of the upper cover 2 and the lower cover 4 and are integrally disposed in the upper 2 and the lower cover 4. Therefore, by securing the upper cover 2 and the lower cover 4 to the camera's interior body by means of the screws 3 and 5, the end 6a of the back lid can be rotatably supported and no particular bearing member need be provided or such bearing member need not be secured to the camera's interior body by means of a screw.

Figure 2:
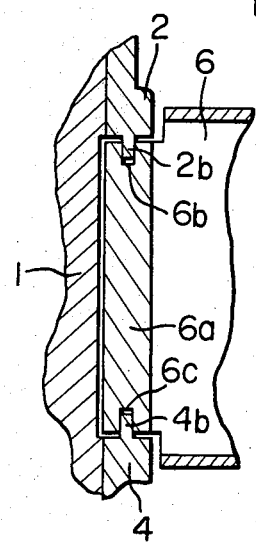
FIG. 2 is a cross-sectional view showing essential portions of a second embodiment of the present invention.

FIG. 2 is a cross-sectional view showing essential portions of a second embodiment of the present invention. In this embodiment, the back lid 6 has recesses 6b and 6c formed along a common straight line on the upper and lower surfaces of the end 6a thereof, and these recesses cooperate with the end 6a to constitute a substantial rotatable shaft. Formed on the opposed surfaces of the upper cover 2 and the lower cover 4 are shaft portions 2b and 4b fitted into the recesses 6b and 6c, respectively, which therefor constitute rotatable shaft means, and these rotatable shaft portions 2b and 4b rotatably support the end 6a of the back lid. These shaft portions are formed by causing the opposed surfaces of the upper cover 2 and the lower cover 4 to be partly projected and are integrally shaped with the upper cover 2 and the lower cover 4, respectively. Again in this embodiment, the upper cover 2 and the lower cover 4 are secured to the camera's interior body 1 by screws as in the first embodiment. Therefore, as in the first embodiment, the end 6a of the back lid may be rotatably supported by securing the upper cover 2 and the lower cover 4 to the camera's interior body 1, and no particular bearing member need be provided or such bearing member need not be secured to the camera's interior body by a screw.

If the upper cover 2 and the lower cover 4 are molded by the use of plastic material or the like, the bearing portions 2a, 4a and the shaft portions 2b, 4b may of course be readily shaped integrally.

According to the present invention, as has been described above in detail, the shaft portions or the bearing portions rotatably supporting the end of the back lid are integrally shaped with the upper cover and the lower cover of the camera and no particular bearing member need be provided or such bearing member need not be secured to the camera body by a screw or the like, but the back lid can be pivotally mounted to the camera body simply by attaching the upper and lower covers to the camera's interior body and the camera body can be manufactured quickly and accurately. Of course, this leads to lower cost.

I claim:

1. A camera body having a pivotally mounted back lid, comprising:
   (a) an interior body;
   (b) a back lid having rotatable shaft means at one end thereof;
   (c) an upper cover and a lower cover removably secured to the upper portion and the lower portion, respectively, of the camera's interior body, said covers having integrally formed therewith outwardly extending axially aligned supporting members for supporting said rotatable shaft means of said back lid on the opposed surfaces of the ends of said covers; and
   (d) securing means for securing said covers to the camera's interior body;

whereby said back lid may be pivotally mounted in a readily removable manner to the camera's interior body by securing said covers to the camera's interior body by said securing means when said lid shaft means are positioned between said covers.

2. A camera body according to claim 1, wherein said rotatable shaft means of said back lid includes projections extending along the rotational axis of said back lid, and the supporting members of said covers include recesses for supporting said projections.

3. A camera body according to claim 1, wherein said rotatable shaft means of said back lid includes recesses and the supporting members of said covers include projections extending along said rotational axis so as to engage with said recesses.

4. A camera body according to claim 2 or 3, wherein said upper cover and said lower cover are formed of plastic material.

* * * * *